United States Patent [19]

Acosta et al.

[11] Patent Number: 5,532,888
[45] Date of Patent: Jul. 2, 1996

[54] CARTRIDGE MAGAZINE WITH CARTRIDGE PROCESSING STATUS INDICATOR

[75] Inventors: Donald C. Acosta, San Jose, Calif.; Paul Y.-F. Hu, Tucson, Ariz.

[73] Assignee: International Business Machines Corporation, Armonk, N.Y.

[21] Appl. No.: 300,092

[22] Filed: Sep. 1, 1994

Related U.S. Application Data

[63] Continuation of Ser. No. 68,366, May 27, 1993, abandoned.

[51] Int. Cl.$^6$ .......................... C11B 15/68; C11B 23/023; C11B 33/02; B65D 85/672
[52] U.S. Cl. ...................... 360/92; 369/36; 369/178; 206/387.15
[58] Field of Search .................... 369/34, 36, 38, 369/178, 75.1, 192; 360/92; 206/387, 444, 308.1, 387.15; 211/40; 312/9.1–9.64

[56] References Cited

U.S. PATENT DOCUMENTS

| | | | |
|---|---|---|---|
| 3,391,792 | 7/1968 | Makar | 312/9.58 |
| 3,603,478 | 9/1971 | Connan | 312/9.42 |
| 3,682,483 | 8/1972 | White | 274/4 |
| 3,758,122 | 9/1973 | Kawaharasaki | 360/92 |
| 3,812,537 | 5/1974 | Grae et al. | 360/92 |
| 3,816,851 | 6/1974 | White et al. | 360/92 |
| 3,825,949 | 7/1974 | Pyles | 360/92 |
| 3,852,818 | 12/1974 | Pyles | 360/92 |
| 4,622,610 | 11/1986 | Makigawa | 360/92 |
| 4,828,341 | 5/1989 | Bohnet et al. | 312/9.57 |
| 4,850,485 | 7/1989 | Ishikawa | 206/387 |
| 4,901,172 | 2/1990 | Nakazawa et al. | 360/98.05 |
| 4,984,111 | 1/1991 | Rudi | 360/96.5 |
| 5,021,902 | 6/1991 | Ishikawa et al. | 360/92 |
| 5,038,235 | 8/1991 | Ohzawa et al. | 360/92 |
| 5,182,686 | 1/1993 | Lindenmeyer | 360/92 |
| 5,232,275 | 8/1993 | Yamazoe | 369/36 |
| 5,247,406 | 9/1993 | Apple et al. | 369/34 |

FOREIGN PATENT DOCUMENTS

| | | | |
|---|---|---|---|
| 0281352 | 3/1990 | Japan | 360/92 |

OTHER PUBLICATIONS

"Autoloader Magazine for Tape Cartridges and Method Therefor", H. A. Lunka and C. P. Marlowe, International Publication No. WO 91/04930; Publication Date: 18 Apr. 1991.

*Primary Examiner*—John H. Wolff
*Assistant Examiner*—William J. Klimowicz
*Attorney, Agent, or Firm*—Baker, Maxham, Jester & Meador

[57] ABSTRACT

A magazine is provided for storing a plurality of cartridges for processing and provides an operator with a visual indication as to the processing status thereof. The magazine includes a base and a pair of elongated sidewalls which are mounted to the base in a spaced-apart relationship so as to receive the cartridges therebetween. A plurality of shelves are connected between the sidewalls of the magazine at spaced intervals therealong for slidably supporting the cartridges. The magazine sidewalls and shelves form a plurality of receptacles, each receptacle having oppositely located open ends so that each receptacle will accommodate the travel of a cartridge therethrough as the cartridge slides on the shelf. First and second stop devices are mounted within each receptacle for stopping travel of a cartridge through the receptacle at first and second positions therealong. The first position indicates that the cartridge has not been processed and the second position indicates that the cartridge has been processed.

19 Claims, 14 Drawing Sheets

Unprocessed Position

Processed Position

Unprocessed Position

Processed Position 5,532,888

CARTRIDGE MAGAZINE WITH CARTRIDGE PROCESSING STATUS INDICATOR

This application is a continuation of U.S. patent application Ser. No. 08/068,366, filed May 27, 1993, now abandoned.

BACKGROUND OF THE INVENTION

1. Field of the Invention

The present invention relates to a magazine for containing a plurality of electronic media cartridges and more particularly to a magazine which will indicate the processing status of the cartridges contained therein.

2. Discussion of the Related Art

When large volumes of data are to be processed in a computer system, it is convenient to employ magazines which accommodate numerous electronic media cartridges, such as magnetic tape cartridges. These magazines will typically contain ten or 12 cartridges in a vertically stacked array. The cartridges can be loaded in the magazine manually or by a remotely operated cartridge picker. Once the cartridges are loaded in the magazine, they are ready for processing, such as during a read operation by a tape drive. In order to perform this operation, a cartridge picker will remove the cartridge from the magazine, transport it to the tape drive and then return the cartridge to the magazine after processing.

The advantage of a magazine is that it confines the cartridges to a compact area where they can be organized in some logical fashion. By having the cartridges vertically stacked they are efficiently positioned for transport operations by the cartridge picker. Because the magazine supports cartridges on individual shelves, the cartridges support only their own weight, and each cartridge can be easily slid along its shelf for the processing operation. Typically the cartridges are placed on shelves from an open side of the magazine and then processed from an opposite open side of the magazine.

In the past, it has been very difficult to ascertain whether or not a particular cartridge in a magazine has been processed by the cartridge picker and cartridge drive. When the magazine is viewed by an operator there is no indication whether or not any processing has occurred. It can be envisioned that many different types of electronic indicators could be devised to provide a visible display. However, this requires a power source and adds undue complexity to the magazine. Therefore, it is desirable that a mechanical indicator be provided so that visual inspection of the magazine will indicate whether or not any one of the cartridges has been processed.

SUMMARY OF THE INVENTION

The present invention provides a cartridge magazine with a mechanical assembly for visually indicating to an operator whether or not any one of the cartridges has been processed. A magazine is provided with a base and a pair of elongated sidewalls. The sidewalls are mounted to the base in a spaced-apart relationship so as to receive the cartridges therebetween. A plurality of shelves are connected between the sidewalls at spaced intervals therealong for slidably supporting the cartridges. The magazine sidewalls and shelves form a plurality of receptacles, each receptacle having oppositely located open ends. With this arrangement each receptacle will accommodate the passage of a cartridge therethrough as the cartridge slides on the shelf. First and second stop devices are mounted within each receptacle for stopping travel of a cartridge through the receptacle at first and second positions therealong. The first stop position indicates that the cartridge has not been processed and the second stop position indicates that the cartridge has been processed. With this arrangement, the position of each cartridge within the magazine will indicate visually to an operator whether or not the cartridge has been processed by the cartridge picker and cartridge drive. In one embodiment of the invention, the magazine has been fashioned for handling standard cartridges which have a notch in each of its sides. With this arrangement, each stop device of the magazine may include a detent for engaging a respective cartridge notch at different positions as the cartridge slides along its respective shelf.

An object of the present invention is to overcome the aforementioned problems associated with prior art cartridge magazines.

Another object is to provide a cartridge magazine which will visually indicate whether or not any one of the cartridges in the magazine has been processed.

A further object is to provide a magazine for a plurality of electronic media cartridges wherein the position of each cartridge within the magazine will indicate the processing status of the cartridge.

Yet another object is to provide a cartridge magazine with a mechanical two-step stopping assembly so that when the cartridge is stopped in one position it will indicate that the cartridge is ready for processing, and when the cartridge is stopped in the second position it will indicate that the cartridge has been processed.

Still another object is to provide a system for processing electronic media cartridges, which system employs a magazine containing numerous cartridges, the magazine positioning the cartridges in unprocessed and processed locations, so that an operator can ascertain the processing status of the cartridges.

These and other objects will be better understood from the following detailed description, taken together with the below described drawings.

DETAILED DESCRIPTION OF THE PREFERRED EMBODIMENTS

Figure 1:
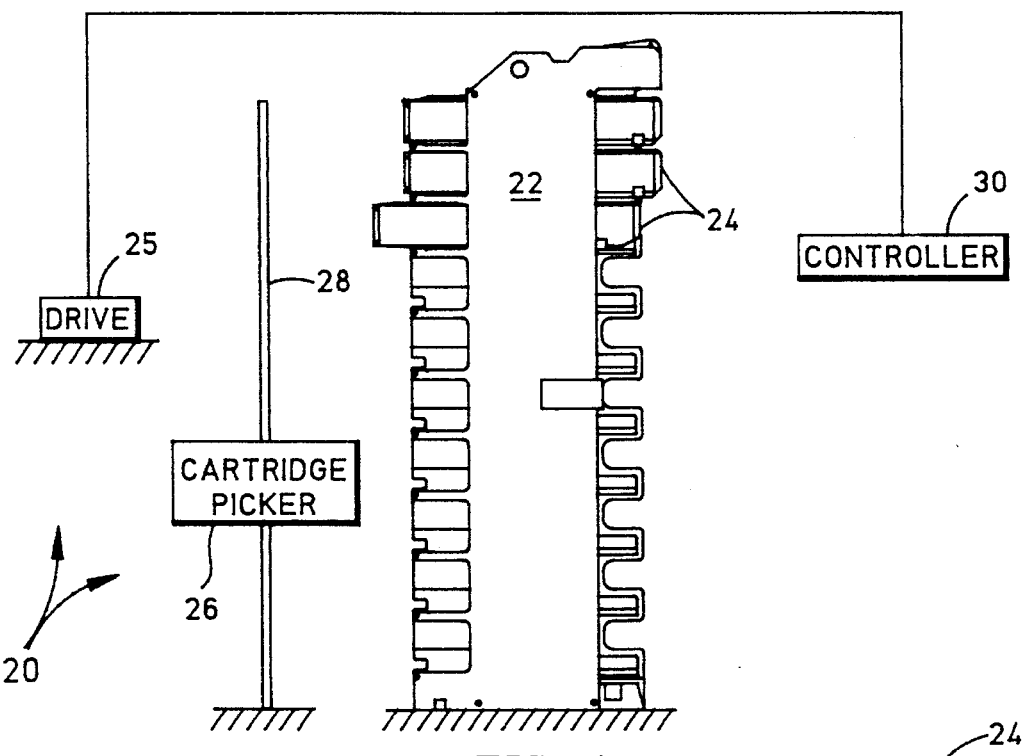
FIG. 1 is a schematic illustration of an electronic media cartridge processing system which employs the cartridge magazine of the present invention.

Referring now to the drawings wherein like reference numerals designate like or similar parts throughout the several views, there is illustrated in FIG. 1 a cartridge processing system 20 which includes a magazine 22 which contains a plurality of cartridges 24. The cartridges 24 may contain data which is stored on any suitable electronic media, such as magnetic tape. The magazine 22 is loaded from the right side of the figure by an operator or by a remotely operated cartridge picker (not shown). When the operator loads the cartridges into the magazine 22, he pushes each cartridge to a first stop position which will indicate that the cartridge is unprocessed, namely that it is ready for processing. The bottom cartridge is shown in this position.

Selected cartridges are transported from the magazine 22 to a cartridge drive 25 by a cartridge picker 26. The cartridge picker 26 operates like an elevator on a vertical guide rail 28, and its operation is controlled by an operator at a control station 30. The cartridge picker 26 withdraws unprocessed cartridges 24 from the magazine 22 and inserts them into the drive 25 for processing. After processing the cartridge picker 26 withdraws the cartridge from the drive 25 and returns it to the magazine 22. The cartridge picker 26 has outwardly extending power operated rollers (not shown) which roll on the sides of the cartridge to move it between the magazine 22 and the cartridge drive 25 via the cartridge picker receptacle at 26.

FIGS. 3, 4, 12 and 13 show three cartridges loaded in the top of the magazine 22, the top two cartridges being in a position indicating that they have been processed by the cartridge picker 26 and the cartridge drive 25 and the bottom cartridge being in a position which indicates that the cartridge has not been processed by the cartridge picker 26 and the cartridge drive 25. A feature of the magazine 22 is that the relative positions of the cartridges therein will indicate to an observer whether or not the cartridges have been processed. The advantage of the magazine 22 is that it can be loaded at some remote location by an operator and then placed adjacent the cartridge picker which operates as an elevator for processing the cartridges in the cartridge drive 25. It should be understood, however, that the use of the magazine with the cartridge picker 26 is exemplary. The magazine could simply be utilized by an operator who pushes the cartridges at different positions within the magazine so as to indicate the processed and unprocessed conditions thereof. Details of this cartridge picker 26, the cartridge drive 25 and the controller 30 are prior art commercially available items which will not be described in more detail herein.

Figure 2:
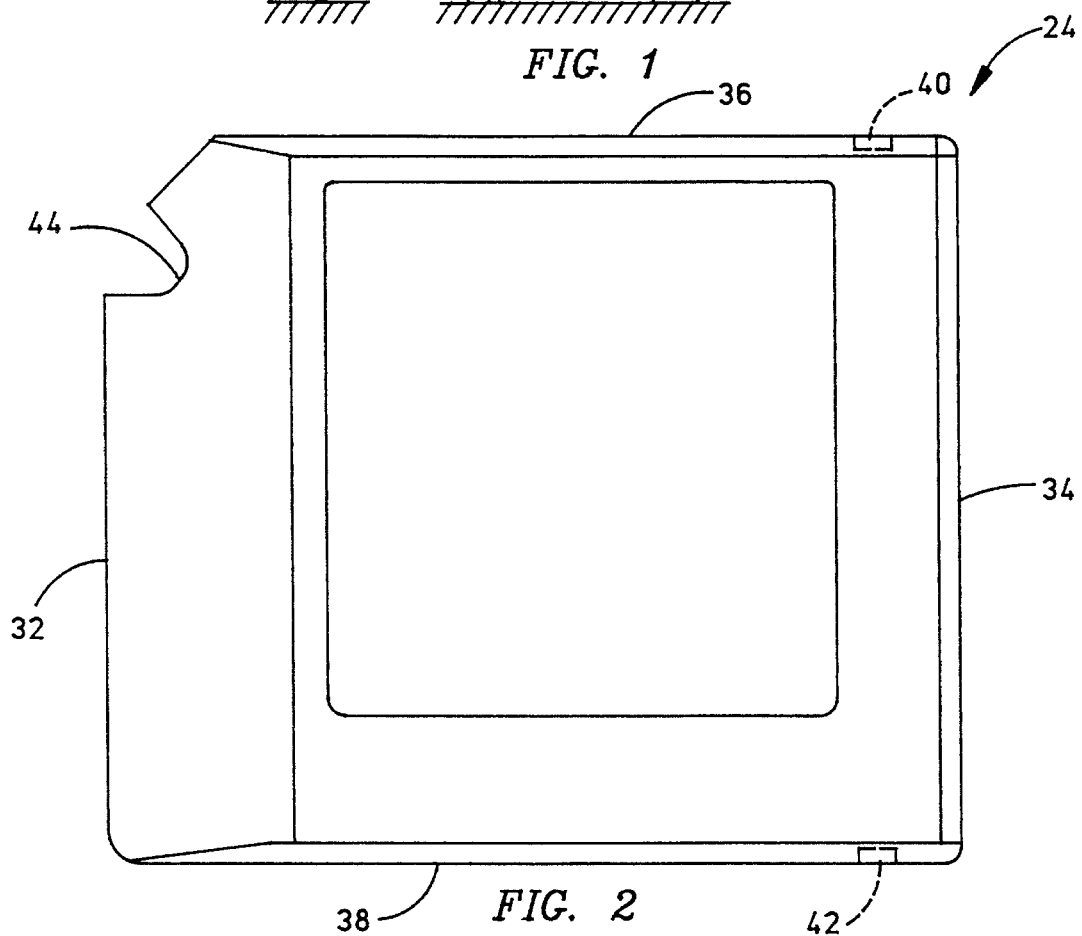
FIG. 2 is an isometric view of an exemplary cartridge for use with the magazine.

The magazine 22 can be used in conjunction with a commercially available magnetic tape cartridge which is known as the 3480/3490E cartridge and which is listed in the ANSI standard. This cartridge is exemplary of the type of cartridge that can be loaded in the magazine 22. As shown in FIG. 2 the cartridge 24 has front and rear ends 32 and 34 which are joined by a pair of oppositely located sides 36 and 38. The distance between the front and rear ends 32 and 34 defines the length of the cartridge, and the distance between the sides defines the width of the cartridge. In the 3480/3490E cartridge, each side 36 and 38 is provided with a respective notch 40 and 42 which are symmetrical with respect to one another. Further, the 3480/3490E cartridge has a front recess 44 for a tape leader block (not shown) which is withdrawn by the cartridge picker 26 for processing the magnetic tape in the cartridge drive 25.

Figure 3:
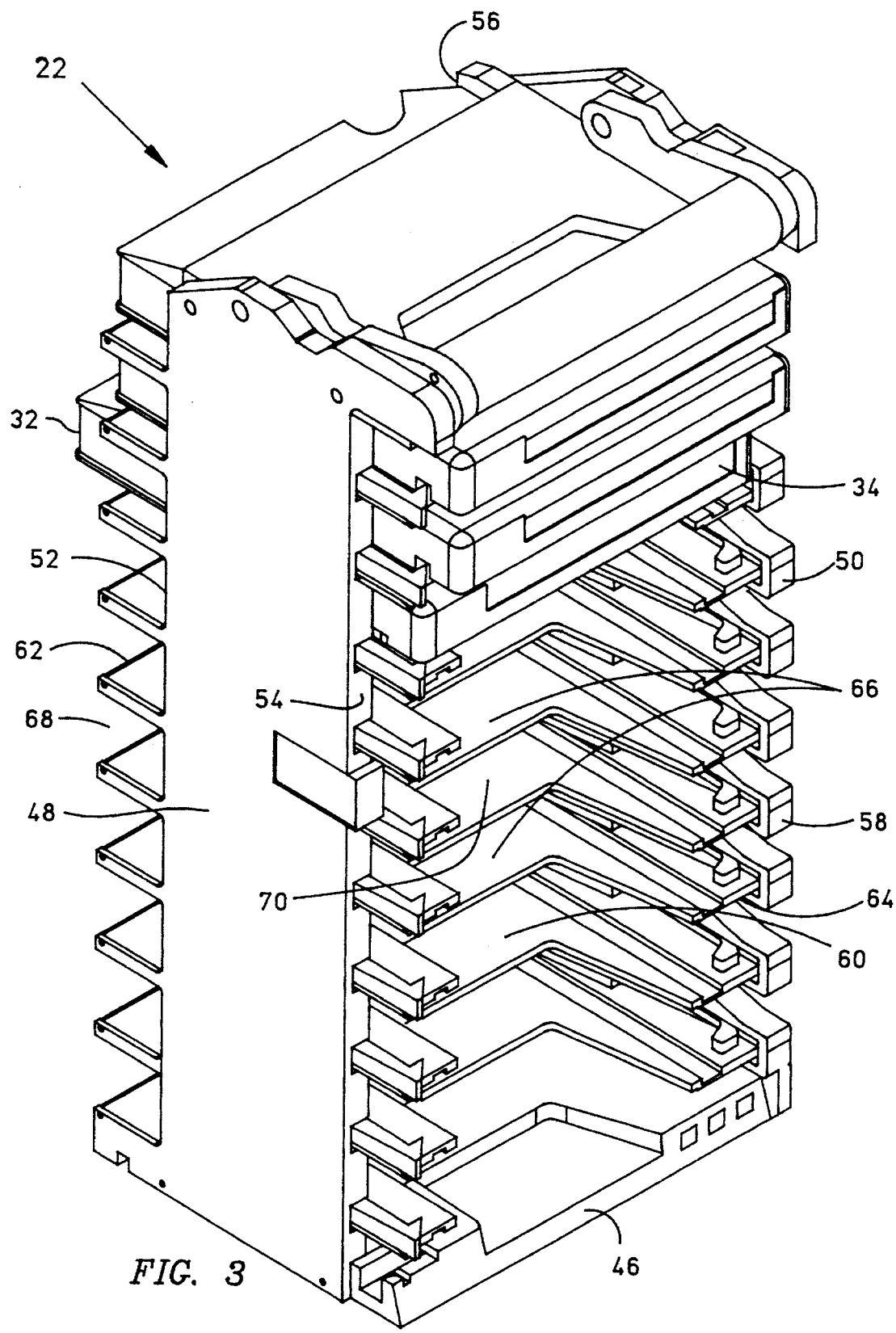
FIG. 3 is an isometric view of the magazine taken from the operator's side with one cartridge shown in an unprocessed position and two cartridges shown in a processed position.
Figure 4:
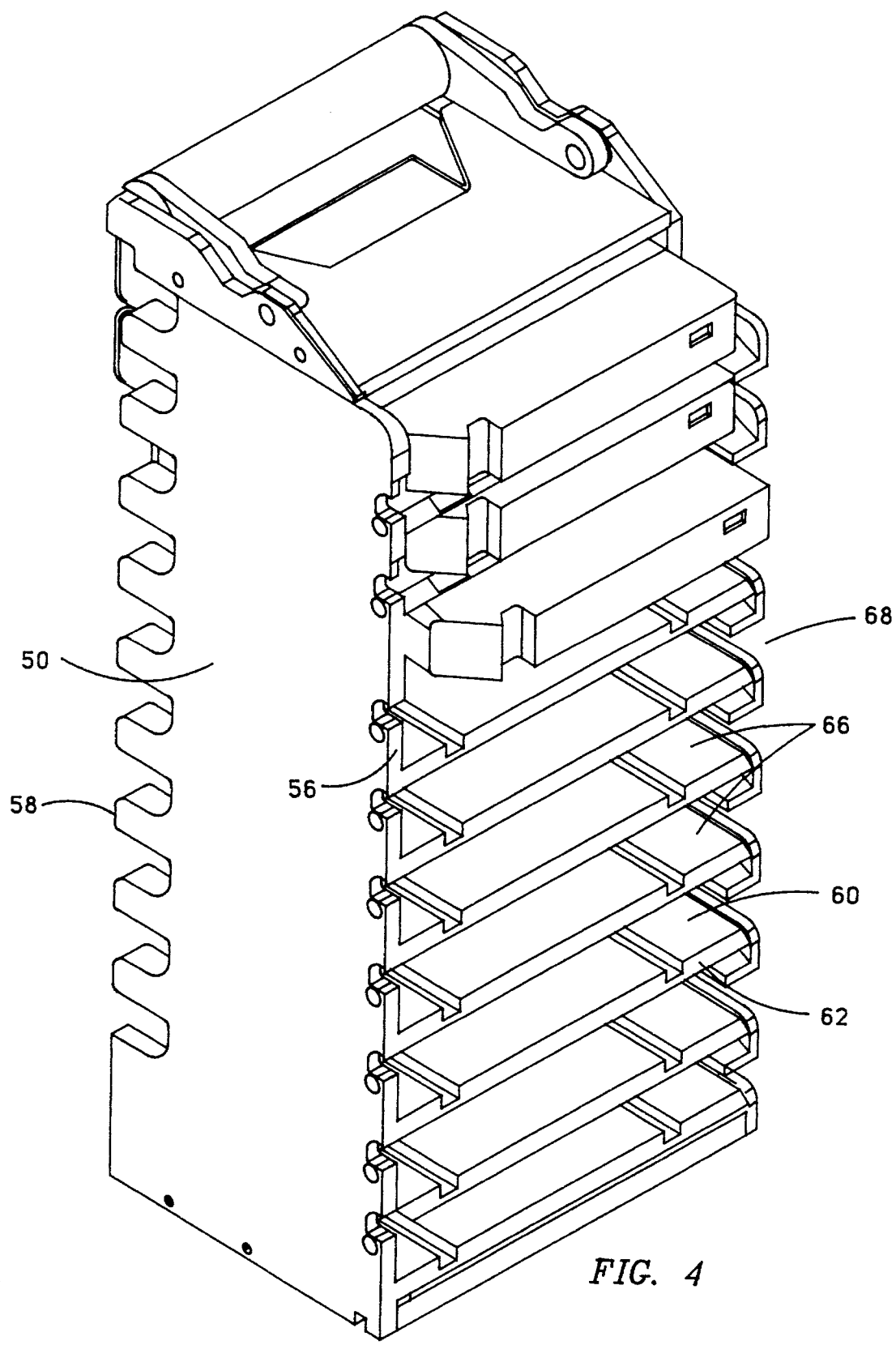
FIG. 4 is an isometric view of the magazine taken from the machine side with one cartridge shown in the unprocessed position and two cartridges shown in the processed position.

As shown in FIGS. 1 and 3, the magazine 22 includes a base 46 and a pair of sidewalls 48 and 50. The sidewalls 48 and 50 are connected to the base 46 in an upstanding spaced-apart relationship so as to accommodate the width of the cartridges 24. The sidewall 48 has front and rear edges 52 and 54 and the sidewall 50 has front and rear edges 56 and 58. The distance between the front and rear edges of each sidewall defines its width. A plurality of shelves 60 are connected between the magazine sidewalls 48 and 50 at spaced intervals therealong, each shelf having front and rear edges 62 and 64. The distance between these edges defines the length of the shelf. The combination of the sidewalls 48 and 50 with the shelves 60 provides a plurality of receptacles 66 which have front and rear open ends 68 and 70 for receiving the cartridges 24. Each shelf is capable of slidably supporting a cartridge 24 for transport into and out of either of the open ends 68 and 70 of the receptacles 66.

Figure 7:
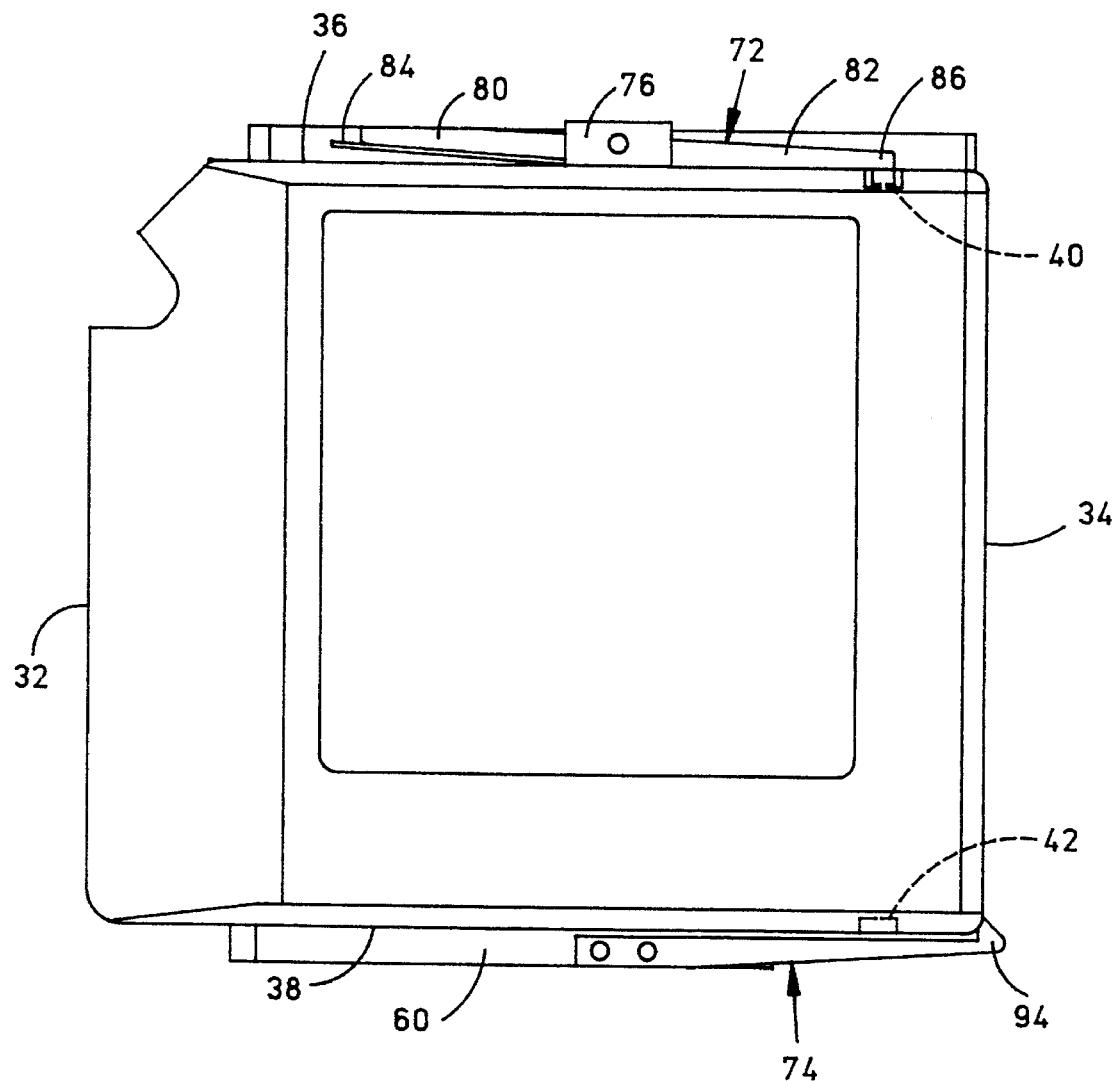
FIG. 7 is a top plan view of the cartridge loaded on a shelf of the magazine with the detents positioning the cartridge in the unprocessed position.
Figure 8:
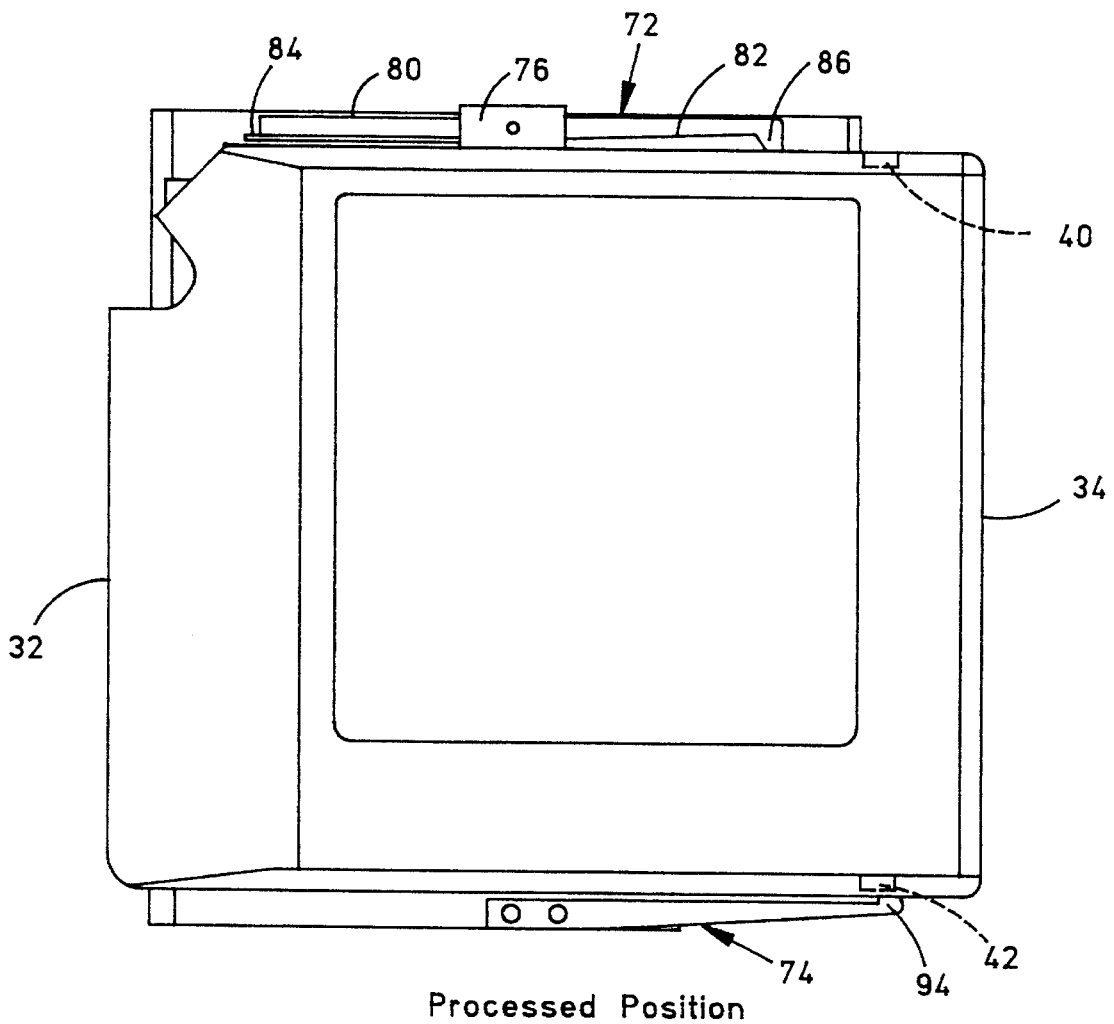
FIG. 8 is a top plan view of the cartridge loaded on a shelf of the magazine with the detents positioning the cartridge in the processed position.
Figure 9:
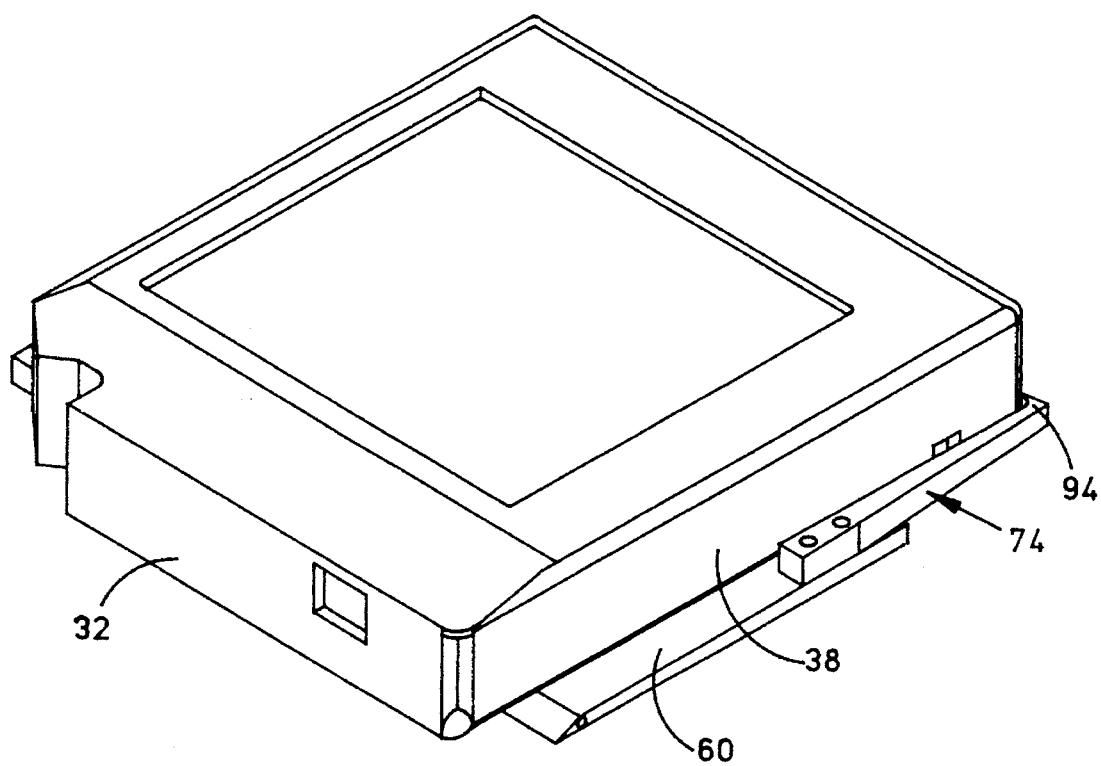
FIG. 9 is an isometric view of the cartridge loaded on a shelf of the magazine with the detents positioning the cartridge in the unprocessed position.
Figure 10:
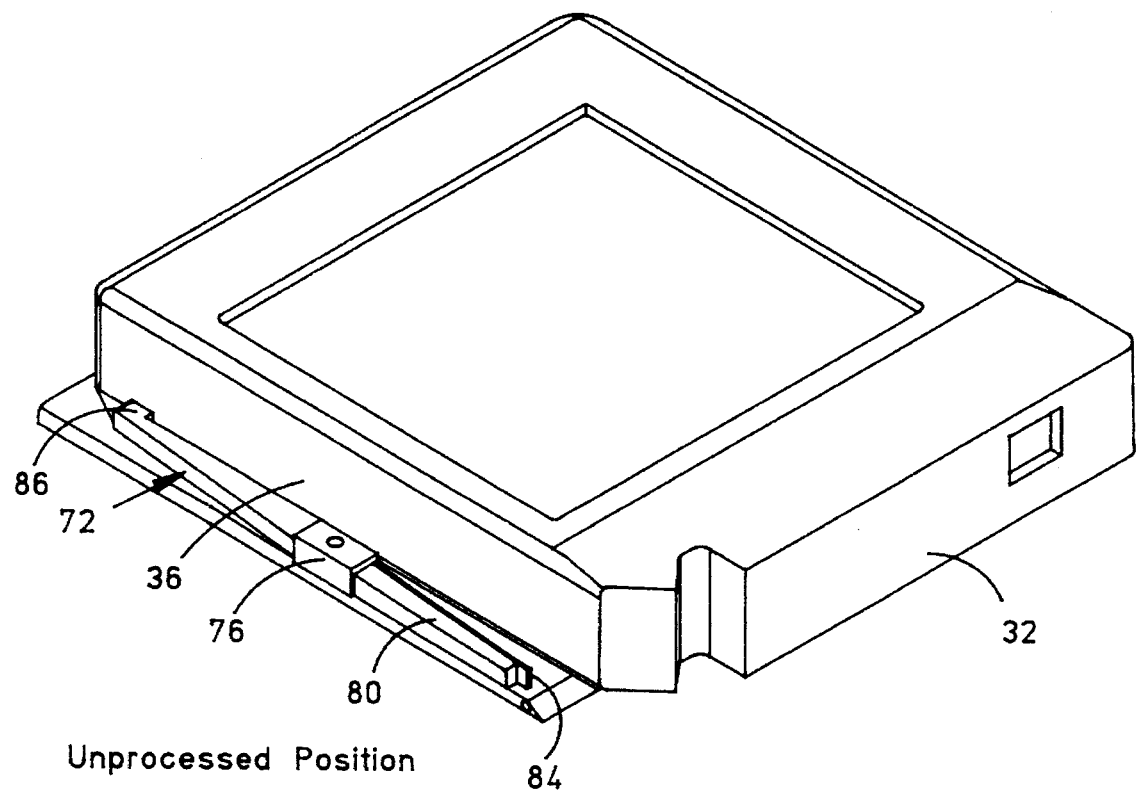
FIG. 10 is an isometric view of the cartridge loaded on a shelf of the magazine with the detents positioning the cartridge in the unprocessed position.
Figure 11:
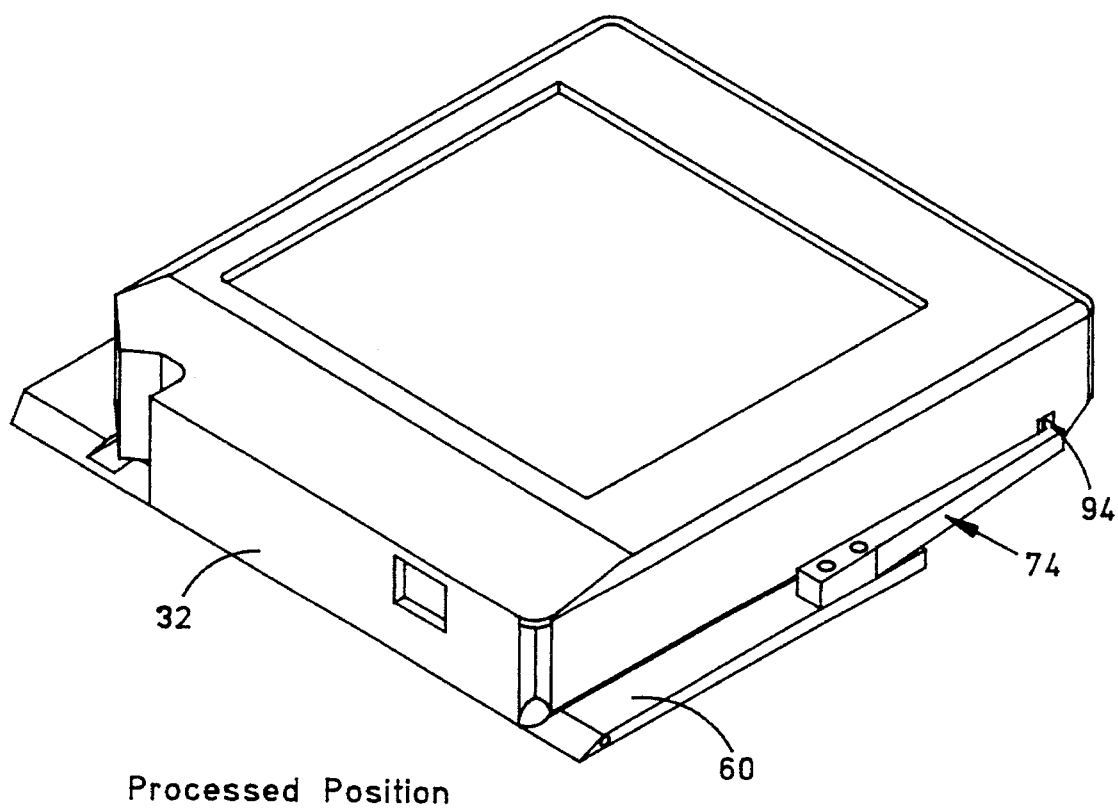
FIG. 11 is an isometric view of the cartridge loaded on a shelf of the magazine with the detents positioning the cartridge in the processed position.

As shown in FIGS. 5–11, a pair of detents 72 and 74 are mounted to a shelf 60 in a spaced-apart relationship so as to accommodate the width of the cartridge 24. As shown in FIGS. 7, 9 and 10, a first one of the detents 72 of each pair of detents releasably engages the cartridge 24 within a first one of the notches 40 to stop the cartridge in a first position along the length of the shelf, and, as shown in FIGS. 8 and 11, a second one of the detents 74 of each pair of detents releasably engages the cartridge in a second one of the notches 40 to stop the cartridge in a second position along the length of the shelf.

Figure 5:
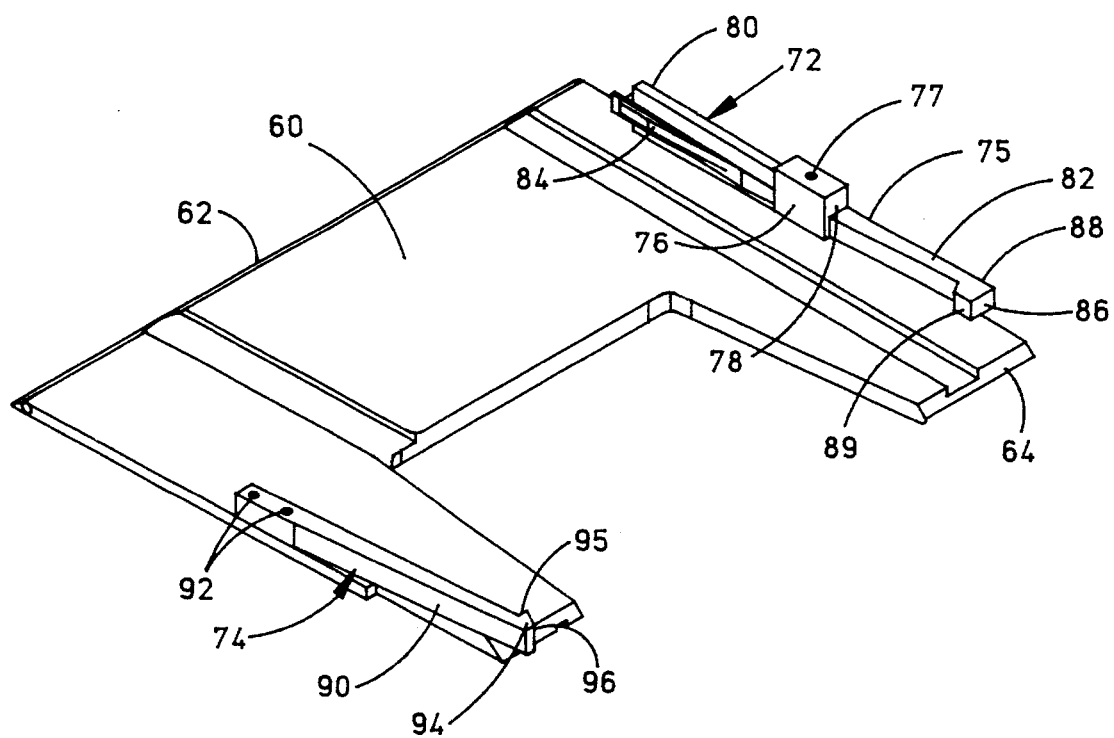
FIG. 5 is an isometric illustration of a shelf and detent portion of the magazine.
Figure 6:
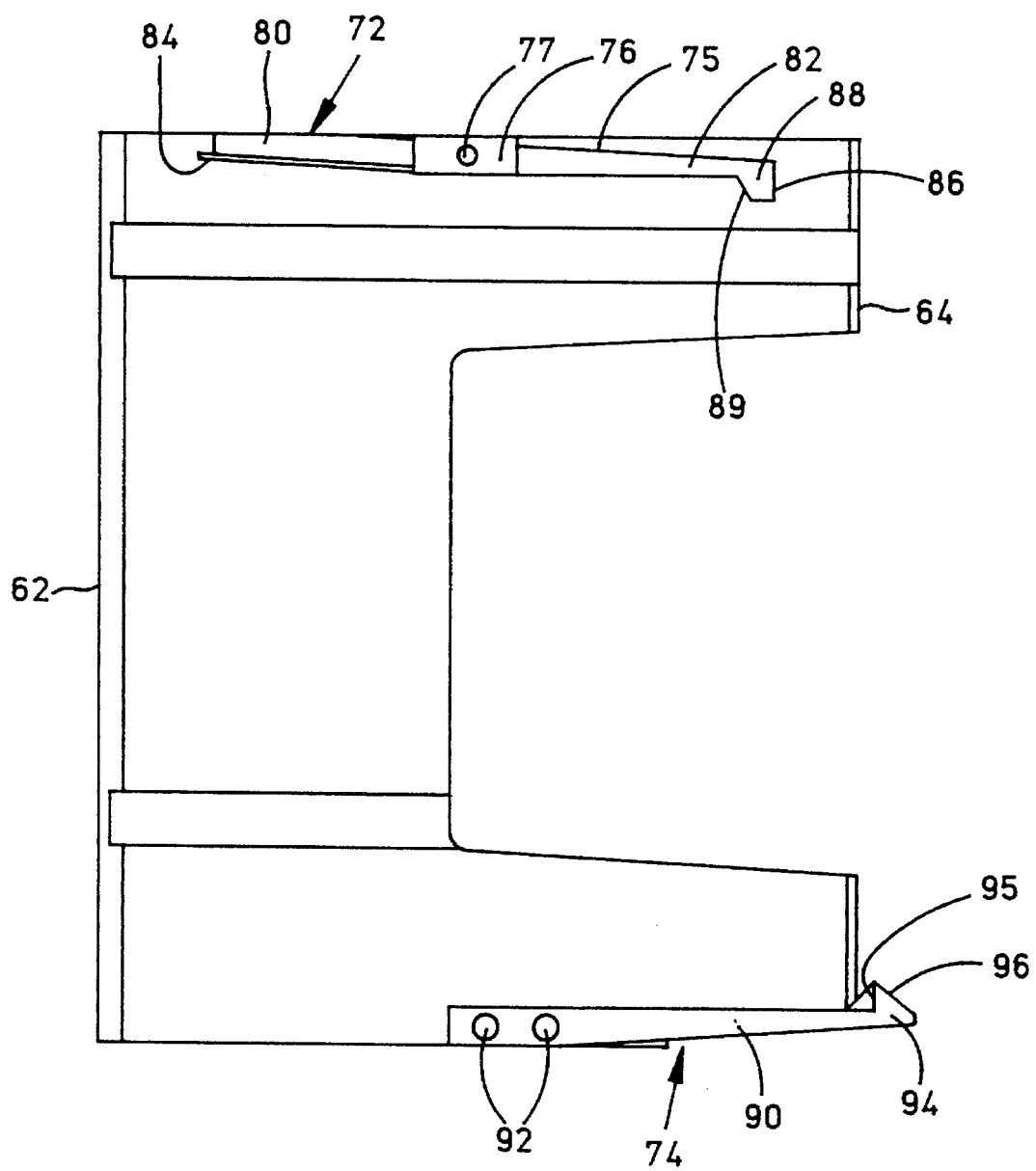
FIG. 6 is a top plan view of a shelf and detent portion of the magazine.

As illustrated in FIG. 5, the first detent 72 may include a lever arm 75 which is pivoted intermediate its ends to the shelf 60 by a pivot block 76. The pivot block 76 is fixed to the shelf adjacent one of its side edges. A pin 77 extends through the block and into the lever arm 75, the pivot block having a cavity 78 so that the lever arm can rock back and forth in a see-saw movement transversely across the shelf. The detent 72 has a forward extension 80 (toward the cartridge picker 26 and cartridge drive 25) and has a rearward extension 82 (toward the operator). A leaf spring 84 is fixedly connected to the block and engages a side of the forward arm extension 80 at an inside location with respect to the shelf 60 so that the rearward arm extension 82 is urged inwardly with respect to the shelf 60. At the outer extremity of the rearward arm extension 82 is a pawl 86 for engaging the first cartridge notch 40 (see FIGS. 7 and 10). The pawl 86 is configured to have a sharp outer corner 88 which has a transverse leg with extends substantially 90° to the longitudinal axis of the arm extension 82. At an opposite corner 89 the pawl is rounded. Accordingly, when the pawl 86 engages the cartridge within the notch 40, the cartridge is locked in position from moving forwardly on the shelf until the arm extension 80 is biased inwardly on the shelf against the force of the spring 84. Because of the rounded corner 89 the cartridge can be pulled rearwardly by the operator to override this engagement. If desired a locking bar (not shown) mounted along the side 48 against the outside of detent ends 82 could be employed to prevent this rearward movement. With such an arrangement the magazine can be moved and tilted in various positions without the cartridges falling out.

The detent 72 allows the cartridge picker 26 to release the pawl 86 from the first cartridge notch 40 by action of the cartridge picker on the arm extension 80. When the cartridge picker 26 has been called to remove a cartridge from the shelf, it has an element (not shown) which engages the outside of the arm extension 80 and forces it inwardly against the spring 84 to pivot the pawl 86 away from and completely out of the first notch 40. At this stage the cartridge 24 is unlocked from the shelf 60 and ready for transport to the cartridge drive 25.

The second detent 74 may include an arm 90 which is secured to the top of the shelf 60 adjacent one of its edges by a pair of pins 92. The arm 90 extends rearwardly from the pins 92 (toward the operator) and terminates in a pawl 94. The pawl 94 has forward and rearward inside beveled positions 95 and 96 so that stopping action of the pawl 74 in the cartridge notch 42 (see FIGS. 8 and 11) can be overridden by urging the magazine either in a forward or rearward direction. The arm 90 can be constructed of any suitable resilient material, such as plastic, so that the arm 90 will flex transversely with respect to the shelf 60 to engage and disengage the cartridge within the notch 42. Another embodiment of the detents will be described hereinbelow with reference to FIG. 14.

As illustrated in FIGS. 5–8, the pawl 86 of the detent 72 is located forward of the pawl 94 of the detent 74. Since the notches 40 and 42 in the cartridge 24 (see FIG. 2) are symmetrical with respect to one another, the different locations of the pawls 86 and 94 will cause the cartridge to stop at first and second positions as it is slid in either a forward or rearward direction on the shelf 60. FIGS. 7, 9 and 10 illustrate the cartridge in a first position which is also known as the unprocessed position or "import" position. In this position, the detent 72 is shown engaging the cartridge within the notch 40 and the detent 74 is shown engaging the rear end 34 of the cartridge at a rounded corner thereof. This positioning of the pawl 94 enables an observer to confirm that the detent 72 has engaged the magazine within the notch 40 and that the magazine is in an unprocessed condition, namely that it is ready for processing by the cartridge picker 26 and cartridge drive 25.

Figure 12:
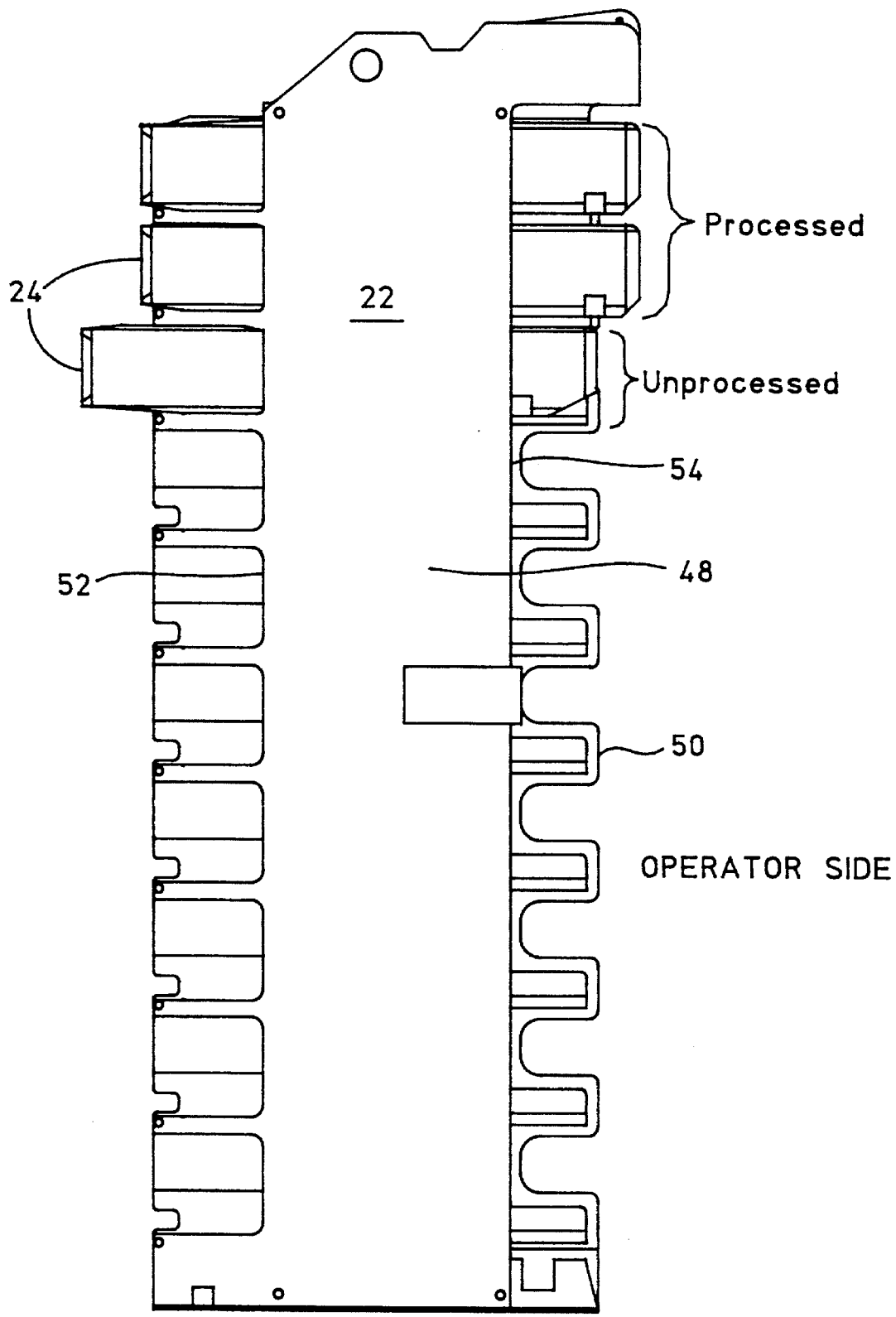
FIG. 12 is a side view of the magazine with one cartridge shown in the unprocessed position and two cartridges shown in the processed position.
Figure 13:
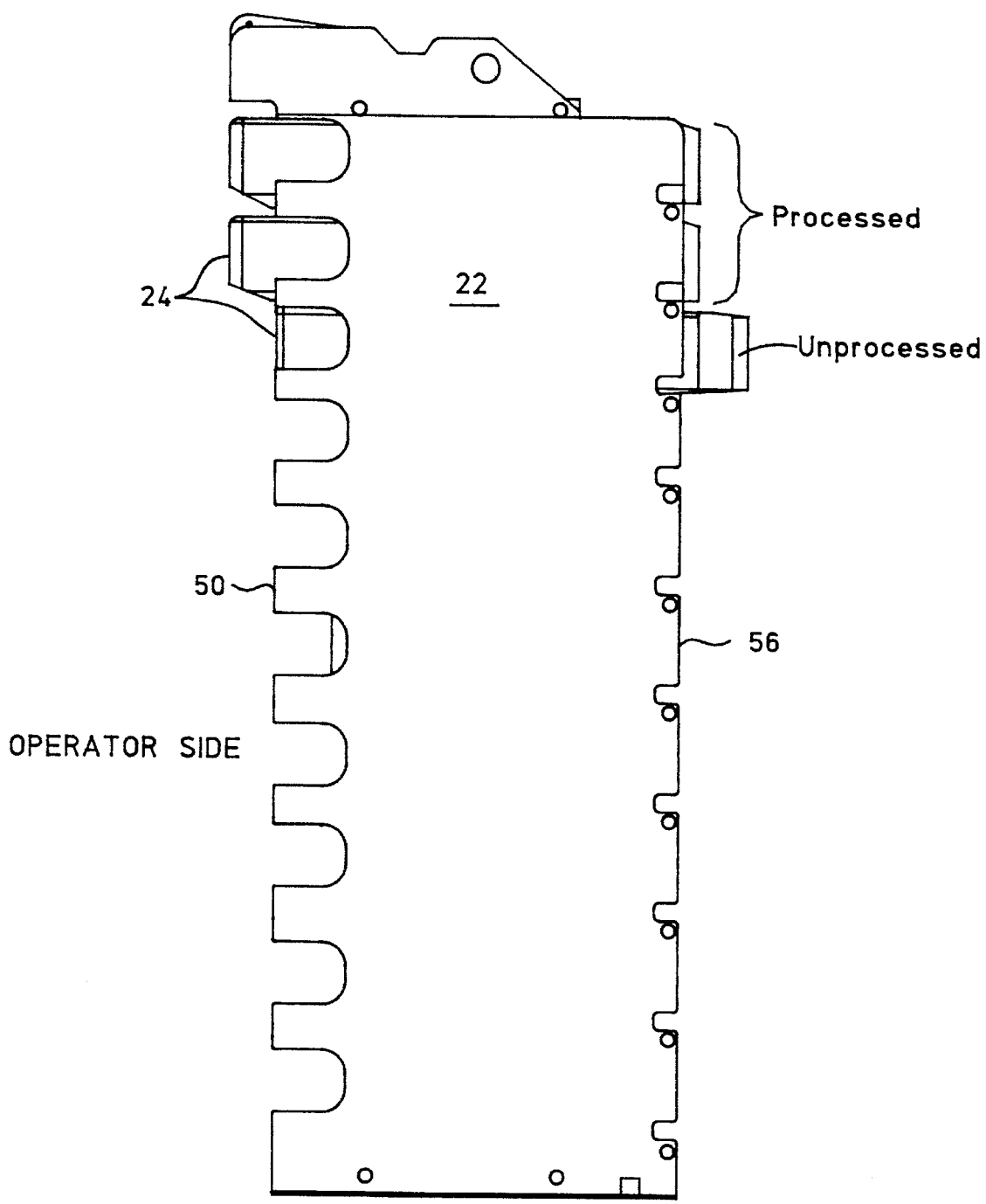
FIG. 13 is an opposite side view of the magazine showing one cartridge in the unprocessed position and two cartridges in the processed position.

In FIGS. 3 and 12, the operator is on the right side of the figures. It can be visualized that when the operator loads the cartridge from the right side onto the shelf the operator will first sense the pawl 94 of the detent 74 engaging the magazine within the notch 42. Upon continuing to push the cartridge to the left (forward with respect to the magazine), the operator overrides the action of the pawl 94 and soon thereafter the detent 72 engages the magazine within the notch 40. In this position the rear end 34 of the cartridge is substantially flush with a rear edge 58 of at least one of the sidewalls 50 of the magazine and the front end 32 of the cartridge extends forwardly of the front edges 52 and 56 of the sidewalls. With this arrangement the flush position of the cartridge with respect to the rear edge 58 indicates that a cartridge is ready for processing and the forward extension of the cartridge beyond the front edges of the sidewalls enables the cartridge picker 26 to grab the cartridge for processing.

The second position of the cartridge within the magazine 22 is also known as the processed position or "export" position. This position is shown in detail in FIGS. 8 and 11. This is the position that a cartridge 24 will assume in the magazine 22 after the cartridge drive 25 has processed the cartridge and the cartridge picker 26 has returned it to the magazine. In this position the pawl 94 of the second detent 74 engages the magazine within the notch 42 while the pawl 86 of the detent 72 is out of the notch 40 and slidably engages the side 38 of the cartridge. It can be visualized that when the machine returns the cartridge to the shelf from the left side of the drawings that the pawl 86 of the detent 72 has to pass the notch 40. It will do so because the cartridge picker has an element (not shown) which depresses the arm extension 80 against the spring force to keep the pawl 86 out of the notch 40 as the cartridge is slid rearwardly in the magazine. Soon after the pawl 86 of the detent 72 passes the notch 40, the pawl 94 of the detent 74 drops into the notch 42 and releasably stops the cartridge on the magazine shelf. The cartridge picker 25 senses this operation and retracts from the magazine to stand ready for its next operation. The rear end 34 of the cartridge now extends rearwardly of the rear edge 58 of the side wall 50 for two purposes. The first purpose is so that this extension will indicate to the operator that the cartridge has been processed. The second purpose is that the extension enables the operator to grasp a portion of the cartridge to remove it from the magazine. When the operator performs this function, the spring force of the detent 74 is overcome and the pawl 94 rides out of the notch 42 and the pawls of both detents slide along the opposite edges of the cartridge until the operator has removed the cartridge from the magazine.

Another arrangement for indicating the processing status of the cartridges 24 is provided by making the width of at least one of the sidewalls of the magazine less than the length of the cartridges. As shown in FIG. 12, the sidewall 48 is provided with a width which is less than the length of the cartridges. The processed and unprocessed cartridges can then readily be detected by their relative positions with respect to the sidewall 48. With this arrangement the operator can view the magazine from a greater distance to determine the processed status of the cartridges as contrasted to the other indicators described hereinabove. This is especially useful when the magazine is out of position with respect to the cartridge picker 25 and cartridge drive 25 and is in a staging area.

Figure 14:
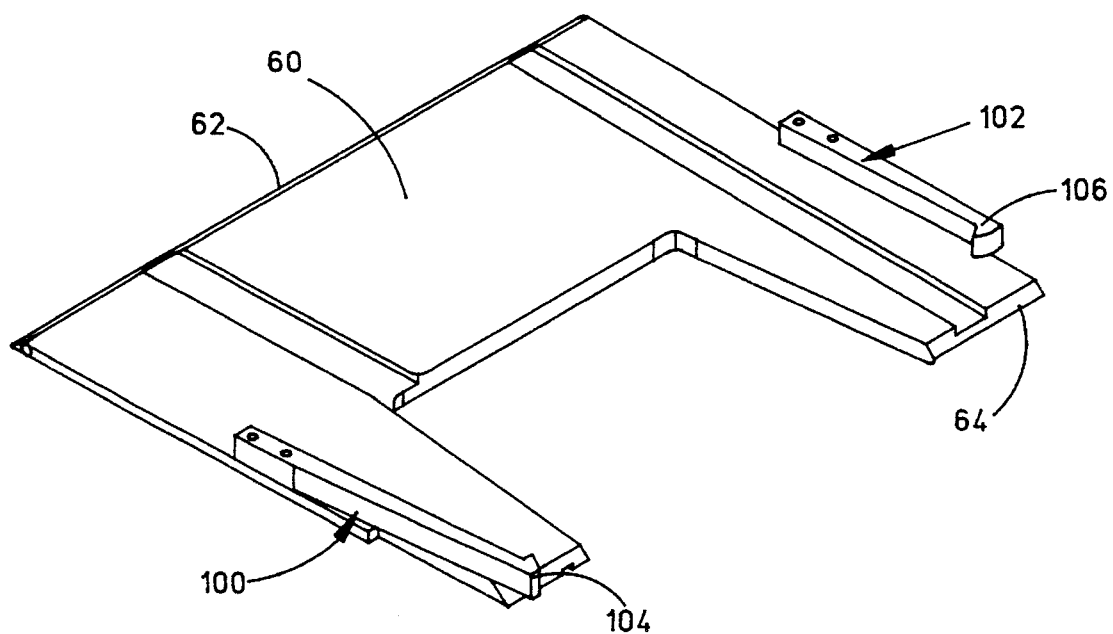
FIG. 14 is an isometric view of a shelf of the magazine with a modified detent arrangement.

In some instances it may be undesirable to have a locking detent as shown at 72 in FIG. 5. FIG. 14 illustrates a pair of detents 100 and 102 which are identical to the detent 74 in FIG. 5. The pawls 104 and 106 are still located differentially along the length of the shelf so that the cartridge will be stopped at the first and second positions therealong to indicate unprocessed and processed conditions. The pawls 104 and 106 are both configured like the pawl 96 of the detent 74, in FIG. 5, so that a sufficient push on either end of the cartridge will overcome the locking action of the respective pawl and allow the cartridge to continue its travel along the shelf. Accordingly, if an operator pushed the cartridge completely through the magazine from either open end he would detect two clicks. This embodiment would be used when the security of the locking action of the detent 72 is not necessary.

Figure 15:
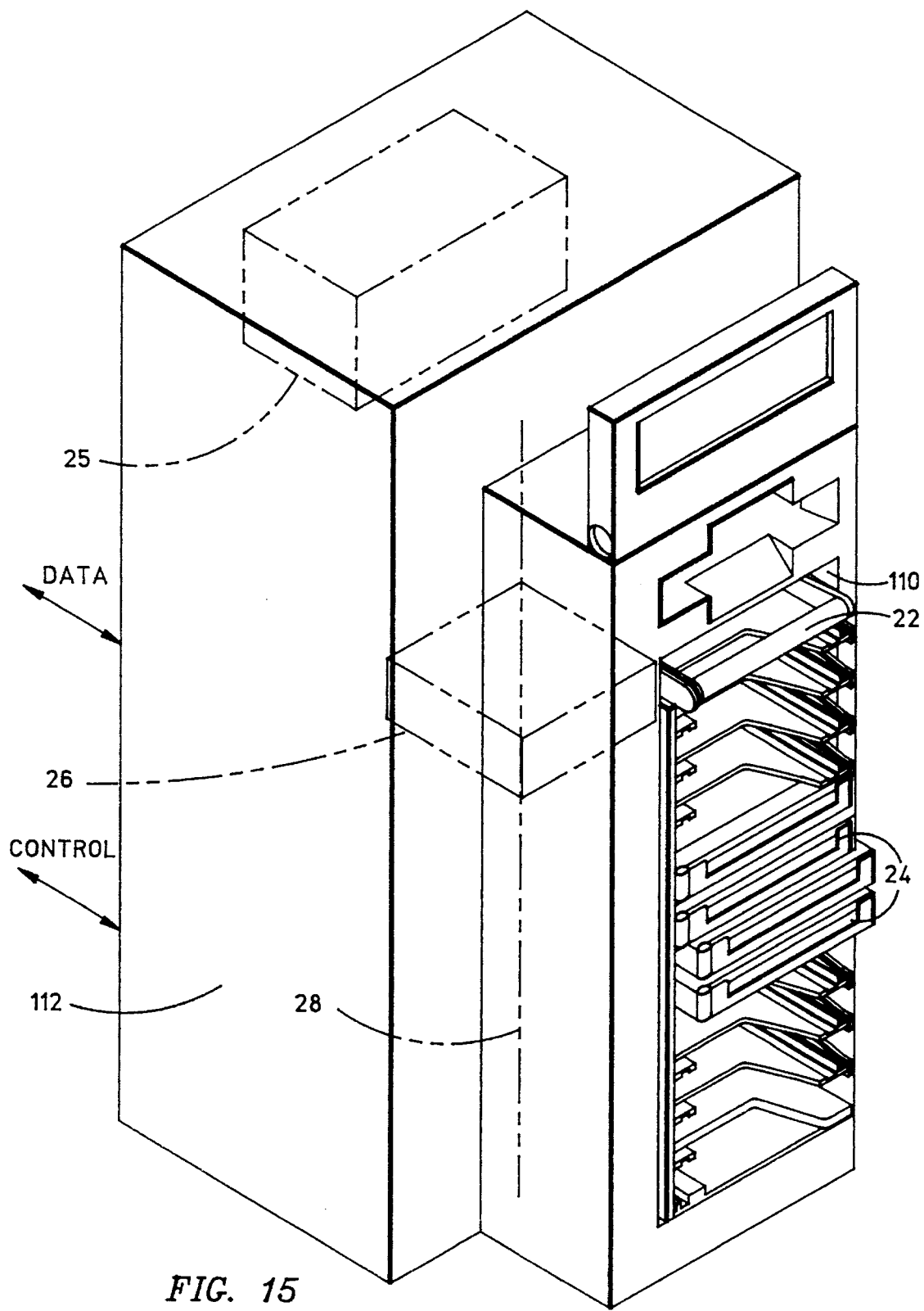
FIG. 15 is an isometric view of an exemplary implementation of the present invention.

An exemplary illustration of the invention is shown in FIG. 15. The magazine 22 is shown mounted in a receptacle 110 of a cabinet 112. The operator can view one end of the cartridges for their relative positions. The opposite ends of the cartridges face inside the cabinet 112 for processing purposes. Within the cabinet are the cartridge picker 26 and the cartridge drive 25. The cartridge picker 26 transports the cartridges between the magazine 22 and the cartridge drive 25. After processing the cartridges assume an outward position within the magazine 22 to indicate to an operator that the cartridge has been processed. The cartridge picker 26 and the cartridge drive 25 may have a control and data interface with a work-station, such as a personal computer (not shown).

In the operation of the invention, an operator loads cartridges into the magazine from the operator's side as seen in FIGS. 3 and 12. As the operator performs this function, he will detect the pawl 74 engaging the cartridge within the notch 42, at which time he continues to push the cartridge forward until the detent 72 engages the cartridge in the notch 40. This is the unprocessed position and is illustrated by the third cartridge down in FIGS. 1, 3, 4, 12 and 13. In this position, the cartridge is locked to prevent further forward movement in place and cannot be processed until the detent 72 is pushed against its spring force to move the pawl 86 out of the notch 40. This will prevent a tipping or a jarring of the magazine in a forward direction from dislodging the cartridges as the magazine is moved from place to place. When the cartridge picker 26 is called to remove the cartridge from the magazine, it extends an element (not shown) which engages the outside end 80 of the detent 72 to release it from the notch 40. The cartridge picker 26 simultaneously rolls rollers (not shown) on the sides of the cartridge to move it into the picker assembly for transporting it to the cartridge drive 25. After processing, the functions are reversed and the cartridge is replaced to the magazine. To accomplish this the cartridge picker 26 once again engages the detent 72 for release purposes and uses its rollers to move the notch 40 of cartridge past the pawl 86 of the detent 72 until the pawl 94 of the detent 74 engages the notch 42. When this occurs the cartridge picker will sense this operation (not shown) and retracts from the magazine to a position for its next operation. The cartridge is now in the processed position which is illustrated by the top two cartridges of FIGS. 1, 3, 4, 12 and 13.

When the operator pushes the cartridge 24 into the magazine 22 to the second stop or locked position, the rear end 34 of the cartridge is flush with the rear edge 58 of the magazine side wall 50. Also, the pawl 94 of the detent 74 engages the rear end 34 of the cartridge. Both of these arrangements indicate to the operator that the cartridge is in the first or unprocessed position and that it is locked in place by the detent 72. The third cartridge down in FIGS. 1, 3, 4, 12 and 13 is in the unprocessed position. After the cartridge is returned to the magazine by the cartridge picker, the rear end 34 of the magazine extends rearwardly beyond the rear end 58 of the magazine sidewall 50 to indicate to the operator that the magazine has been processed. The top two cartridges in FIGS. 1, 3, 4, 12 and 13 have been processed. FIG. 12 illustrates that the narrow width of the sidewall 48 enables an operator at some distance from the magazine to visually detect whether the cartridges have been processed or are unprocessed.

Although the invention has been described in terms of a specific embodiment, the inventors contemplate that modifications and substitutions to various components of the inventions would occur to persons of ordinary skill in the art and, therefore, would be within the scope of the invention, which is to be limited only by the claims which follow.

We claim:

1. A magazine for storing electronic media cartridges for processing, the cartridges being of a type having front and rear ends joined by first and second oppositely located sides which have first and second notches respectively, a distance between the front and rear ends defining the length of the cartridge and a distance between the sides defining the width of the cartridge, each notch having a length along the length of the cartridge, the magazine comprising:

a base;

a pair of sidewalls connected to the base in an upstanding, spaced-apart relationship so as to accommodate the widths of the cartridges, each sidewall having front and rear edges, a distance between the front and rear edges defining the width of a sidewall;

a plurality of shelves connected between the magazine sidewalls at spaced intervals therealong, each shelf having front and rear edges, a distance between the front and rear edges defining the length of the shelf;

the sidewalls and shelves forming a plurality of receptacles, each receptacle having front and rear open ends for receiving a respective one of said cartridges;

each shelf being capable of slidably supporting a respective one of said cartridges for transport into and out of each of the open ends of a respective one of said receptacles;

a pair of detents mounted to each shelf in a spaced apart relationship so as to accommodate the width of a respective one of the cartridges;

a first one of the detents of each pair of detents being receivable by the first notch of a respective one of the cartridges for releasably engaging the cartridge and stopping the cartridge in a first position along the length of the shelf and the second one of the detents of each pair of detents being receivable by the second notch of the cartridge for releasably engaging the cartridge and stopping the cartridge in a second position which is spaced from the first position along the length of the shelf;

a movement of one of said cartridges between the first position and the second position along a respective shelf being a distance more than a length of a notch in said cartridge; and when the first detent is received in the first notch the second detent not being received by the second notch and when the second detent is received in the second notch the first detent not being received by the first notch.

2. A magazine as claimed in claim 1 including:

the width of at least one of the sidewalls being less than the length of one of said cartridges; and the first position of the cartridge with respect to said one sidewall indicating that the cartridge has not been processed and the second position of the cartridge with respect to said one sidewall indicating that the cartridge has been processed.

3. A magazine as claimed in claim 1 including:

the first detent engaging the cartridge within the first notch and the second detent substantially engaging a rear end of the cartridge when the cartridge is in the first position, and the second detent engaging the cartridge within the second notch and the first detent slidably engaging the side of the cartridge when the cartridge is in the second position.

4. A magazine for storing a plurality of cartridges for processing, each cartridge having first and second notches, the magazine comprising:

a base;

a pair of elongated sidewalls mounted to the base in a spaced apart relationship so as to receive said cartridges therebetween;

a plurality of shelves connected one above the other between the sidewalls of the magazine at spaced intervals therealong for slidably supporting the cartridges;

the magazine sidewalls and shelves forming a plurality of receptacles one above the other, each receptacle having a pair of oppositely located open ends to accommodate the travel of a respective one of said cartridges completely through the receptacle from one open end to the other open end as the cartridge slides on a respective shelf;

first stop means and second stop means mounted to and within each receptacle for engaging said first and second notches respectively of one of said cartridges for stopping travel of a respective one of the cartridges through the receptacle at first and second positions therealong respectively;

the first stop means stopping the cartridge with an end of the cartridge being substantially flush with an open end of the receptacle for indicating that the cartridge has not been processed; and the second stop means stopping the cartridge with said end of the cartridge extended beyond said open end of the receptacle for indicating that the cartridge has been processed.

5. A combination for storing and processing a plurality of cartridges each cartridge having first and second notches, the combination comprising:

a magazine having a base;

a pair of elongated sidewalls mounted to the base in a spaced apart relationship so as to receive said cartridges therebetween;

a plurality of shelves connected one above the other between the sidewalls of the magazine at spaced intervals therealong for slidably supporting the cartridges;

the magazine sidewalls and shelves forming a plurality of receptacles one above the other, each receptacle having a pair of oppositely located open ends to accommodate the travel of a respective one of said cartridges completely through the receptacle from one open end to the other open end as the cartridge slides on a respective shelf;

a plurality of said cartridges mounted in the receptacles;

first stop means and second stop means mounted to a shelf within each receptacle for engaging said first and second notches of a respective one of said cartridges for stopping travel of the cartridge through the receptacle at first and second positions therealong respectively;

the first stop means within each receptacle for stopping a respective one of the cartridges with one of its ends substantially flush with an open end of the receptacle for indicating that the cartridge has not been processed;

the second stop means within each receptacle for stopping the cartridge with said end of the cartridge extended beyond said end of the receptacle for indicating that the cartridge has been processed;

a cartridge drive for receiving and processing said cartridges by read and/or write operations; and a cartridge picker for transporting said cartridges between the magazine and the cartridge drive.

6. A combination as claimed in claim 5 including:

at least one of the sidewalls of the magazine having a width which is less than the length of one of said cartridges so as to provide a side view of whether the cartridge is in the first or second position within the magazine.

7. A magazine for storing electronic media cartridges for processing, the cartridges being of a type having front and rear ends joined by first and second oppositely located sides which have first and second notches, respectively, a distance between the front and rear ends defining the length of the cartridge and a distance between the sides defining the width of the cartridge, the magazine comprising:

a base;

a pair of sidewalls connected to the base in an upstanding, spaced-apart relationship so as to accommodate the widths of the cartridges, each sidewall having front and rear edges, a distance between the front and rear edges defining the width of a respective one of the sidewalls;

a plurality of shelves connected between the magazine sidewalls at spaced intervals therealong, each shelf having front and rear edges, a distance between the front and rear edges defining the length of the shelf;

the sidewalls and shelves forming a plurality of receptacles, each receptacle having front and rear open ends for receiving cartridges;

each shelf being capable of slidably supporting a respective one of said cartridges for transport into and out of each of the open ends of a respective one of said receptacles;

a pair of detents mounted to each shelf in a spaced apart relationship so as to accommodate the width of a cartridge;

a first one of the detents of each pair of detents being receivable by the first notch of the first side of a respective one of said cartridges for releasably engaging the cartridge and stopping the cartridge in a first position along the length of the shelf and the second one of the detents of each pair of detents being receivable by the second notch of the second side of the cartridge for releasably engaging the cartridge and stopping the cartridge in a second position along the length of the shelf;

the rear end of one of said cartridges being substantially flush with the rear edge of at least one of said sidewalls of the magazine and the front end of the cartridge extending forwardly of the front edges of the sidewalls of the magazine for processing when the first detent stops the cartridge at the first position; and the rear end of the cartridge extending rearwardly of the rear edge of one of said sidewalls of the magazine for removal of the cartridge after its processing when the second detent stops the cartridge at the second position, whereby the flush position indicates that the cartridge is ready for processing and the rearwardly extending position of the cartridge indicates that the cartridge has been processed.

8. A magazine for storing electronic media cartridges for processing, the cartridges being of a type having front and rear ends joined by first and second oppositely located sides which have first and second notches respectively, a distance between the front and rear ends defining the length of the cartridge and a distance between the sides defining the width of the cartridge, the magazine comprising:

a base;

a pair of sidewalls connected to the base in an upstanding, spaced-apart relationship so as to accommodate the widths of the cartridges, each sidewall having front and rear edges, a distance between the front and rear edges defining the width of one of the sidewalls;

a plurality of shelves connected between the magazine sidewalls at spaced intervals therealong, each shelf having front and rear edges, a distance between the front and rear edges defining the length of the shelf;

the sidewalls and shelves forming a plurality of receptacles, each receptacle having front and rear open ends for receiving said cartridges;

each shelf being capable of slidably supporting a respective one of said cartridges for transport into and out of each of the open ends of a respective one of said receptacles;

a pair of detents mounted to each shelf in a spaced apart relationship so as to accommodate the width of a respective one of said cartridges;

a first one of the detents of each pair of detents being receivable by the first notch of the first side of a respective one of said cartridges for releasably engaging the cartridge and stopping the cartridge in a first position along the length of the shelf and the second one of the detents of each pair of detents being receivable by the second notch of the cartridge for releasably engaging the cartridge and stopping the cartridge in a second position along the length of the shelf;

the first detent engaging the first side of the cartridge within the first notch and the second detent substantially engaging said rear end of the cartridge when the cartridge is in the first position, and the second detent engaging the second side of the cartridge within the second notch and the first detent slidably engaging the first side of the cartridge when the cartridge is in the second position;

the rear end of one of said cartridges being substantially flush with the rear edge of at least one of the sidewalls of the magazine and the front end of the cartridge extending forwardly of the front edges of the sidewalls of the magazine for processing when the first detent stops the cartridge at the first position; and the rear end of one of said cartridges extending rearwardly of the rear edge of one of the sidewalls of the magazine for removal of the cartridge after its processing when the second detent stops the cartridge at the second position, whereby the flush position indicates that one of said cartridges is ready for processing and the rearwardly extending position of the cartridge indicates that the cartridge has been processed.

9. A magazine as claimed in claim 8 including:

the width of at least one of the sidewalls being less than the length of a respective one of the cartridges; and the first position of the cartridge with respect to said one sidewall indicating that the cartridge has not been processed and the second position of the cartridge with respect to said one sidewall indicating that the cartridge has been processed.

10. A combination including the magazine of claim 9, the combination comprising:

a cartridge drive for receiving and processing said cartridges by read and/or write operations; and a cartridge picker for transporting said cartridges between the magazine and the cartridge drive.

11. A combination as claimed in claim 10 comprising:

a plurality of said cartridges mounted in the magazine.

12. A magazine for storing and indicating processed and unprocessed conditions of a plurality of cartridges wherein each cartridge of said plurality of cartridges has top and bottom flat surfaces which are bounded by front and rear ends and first and second oppositely located sides, a distance between the front and rear ends defining the length of the cartridge and a distance between the sides defining a width of the cartridge, the first side of the cartridge having a first notch and the second side having a second notch, each notch having a length along the length of the cartridge, the magazine including:

a base;

a plurality of shelves mounted on the base and interconnected one above the other for slidably supporting a plurality of the cartridges;

each shelf having a pair of oppositely located first and second open ends to accommodate movement of a respective one of the cartridges into one of the first and second open ends, travel across the shelf and out one of the second and first open ends respectively;

first stop means and second stop means mounted to each shelf for engaging said first and second notches respectively for stopping travel of the cartridge as it slides on the shelf at first and second spaced apart stop positions along the shelf, the first stop position indicating to an observer that the cartridge has not been processed and the second stop position for visibly indicating to an observer that the cartridge has been processed;

the first stop means having a detent which is receivable in the first notch for stopping travel of the cartridge along a respective shelf at said first stop position and the second stop means having a detent which is receivable in the second notch for stopping travel of the cartridge along the shelf at said second stop position;

a movement of a respective one of the cartridges between the first and second stop positions along a respective shelf being a distance more than a length of either of the first and second notches; and when the detent of the first stop means is received by the first notch, the detent of the second stop means not being received by the second notch and when the detent of the second stop means is received by the second notch, the detent of the first stop means not being received by the first notch.

13. A magazine as claimed in claim 12 including:

a sidewall mounted to the base and extending vertically upward therefrom across the shelves;

the sidewall having a vertical edge to visibly indicate to an observer the first and second stop positions of each cartridge in the magazine by relative positions of the cartridge with respect to said vertical edge.

14. A combination including the magazine as claimed in claim 13, the combination including:

a cartridge drive for receiving and processing a respective one of said cartridges by read and write operations;

a cartridge picker for transporting said cartridges between the magazine and the cartridge drive, the cartridge picker removing one of the cartridges completely from the magazine when the cartridge is in the first stop position and returning the cartridge to the magazine in the second stop position.

15. A combination as claimed in claim 14 including:

said plurality of cartridges being mounted on the shelves of the magazine.

16. A magazine as claimed in claim 13 including:

the first stop means stopping a respective one of the cartridges with one of its ends substantially flush with the vertical edge of the sidewall when the cartridge has not been processed and the second stop means stopping the cartridge with said one of its ends spaced from the edge of the sidewall when the cartridge has been processed.

17. A magazine as claimed in claim 13 including:

the sidewall having a length along one of the shelves which is less than the length of the cartridge.

18. A magazine as claimed in claim 13 including:

when the cartridge is in the first stop position, the detent of the first stop means engages the cartridge within the first notch and the detent of the second stop means substantially engages the rear end of the cartridge and when the cartridge is in the second stop position the detent of the second stop means engages the second side of the cartridge within the second notch and the detent of the first stop means slidably engages the first side of the cartridge.

19. A magazine as claimed in claim 13 including:

another sidewall mounted to the base and extending vertically therefrom in a spaced relationship with respect to the first mentioned sidewall so that the shelves in combination with the sidewalls form a plurality of receptacles for the cartridges.

\* \* \* \* \*

UNITED STATES PATENT AND TRADEMARK OFFICE
CERTIFICATE OF CORRECTION

PATENT NO. : 5,532,888
DATED : July 2, 1996
INVENTOR(S) : Acosta et al.

It is certified that error appears in the above-indentified patent and that said Letters Patent is hereby corrected as shown below:

On title page,
Item [75] change Paul Y.-F. Hu to --Paul Yu-Fei Hu--

Signed and Sealed this

Third Day of December, 1996

Attest:

BRUCE LEHMAN

Attesting Officer     Commissioner of Patents and Trademarks